(12) United States Patent
  Chatterjee

(10) Patent No.: US 9,253,314 B2
(45) Date of Patent: *__Feb. 2, 2016__

(54) METHOD FOR PRESENTING INTERACTIVE INFORMATION ABOUT A TELECOMMUNICATION USER

(71) Applicant: CenturyLink Intellectual Property LLC, Denver, CO (US)

(72) Inventor: Koushik Chatterjee, Orlando, FL (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/016,886

(22) Filed: Sep. 3, 2013

(65) Prior Publication Data

US 2014/0003594 A1  Jan. 2, 2014

Related U.S. Application Data

(63) Continuation of application No. 11/977,545, filed on Oct. 25, 2007, now Pat. No. 8,553,864.

(51) Int. Cl.
  *H04M 1/56* (2006.01)
  *H04M 15/06* (2006.01)
  *H04M 1/64* (2006.01)
  *H04M 11/00* (2006.01)
  (Continued)

(52) U.S. Cl.
  CPC ........ *H04M 3/42042* (2013.01); *H04M 3/4211* (2013.01); *H04M 3/42068* (2013.01); *H04M 3/493* (2013.01); *H04M 2201/38* (2013.01); *H04M 2203/2072* (2013.01)

(58) Field of Classification Search
  USPC ............ 379/88.19, 88.2, 88.21, 93.17, 93.23, 379/142.01, 142.04, 142.06, 142.09, 379/142.14, 142.17; 705/14.4, 14.43, 705/14.49, 14.56, 14.66
  See application file for complete search history.

(56) References Cited

U.S. PATENT DOCUMENTS

| 5,546,447 | A | * | 8/1996 | Skarbo et al. ............ 379/142.05 |
| 6,385,586 | B1 | | 5/2002 | Dietz |
| 6,539,359 | B1 | | 3/2003 | Ladd et al. |

(Continued)

OTHER PUBLICATIONS

U.S. Appl. No. 12/146,049; Final Rejection dated Jan. 29, 2014; 11 pages.

(Continued)

*Primary Examiner* — Binh Tieu
(74) *Attorney, Agent, or Firm* — Swanson & Bratschun, L.L.C.

(57) ABSTRACT

A method and system for presenting interactive information about a party in a telecommunication call are provided. The party may be a calling party or a called party. Providing interactive information may include identifying a party in a telecommunication call and receiving interactive information about the party. The received interactive information may be combined with user data to form combined interactive information. The combined interactive information may be displayed to a user. A user-action relating to the displayed combined interactive information may be received and an operation corresponding to the user-action may be performed. Providing interactive information may include determining if the user data is needed by analyzing the interactive information. The interactive information may include events, and the user data may include the user's schedule. The combining may correlate the events with the schedule and creates a set of user-actions based on the correlation.

12 Claims, 4 Drawing Sheets

(51) Int. Cl.
*H04M 3/42* (2006.01)
*H04M 3/493* (2006.01)

(56) References Cited

U.S. PATENT DOCUMENTS

| | | | |
|---|---|---|---|
| 6,628,770 | B1 | 9/2003 | Jain et al. |
| 6,675,008 | B1 | 1/2004 | Paik et al. |
| 6,681,004 | B2 | 1/2004 | Strubbe et al. |
| 6,785,368 | B1 | 8/2004 | Eason et al. |
| 6,873,692 | B1 | 3/2005 | Silver et al. |
| 7,027,986 | B2 | 4/2006 | Caldwell et al. |
| 7,035,388 | B2 * | 4/2006 | Kurosaki ............... 379/142.06 |
| 7,085,257 | B1 * | 8/2006 | Karves et al. ............. 370/352 |
| 7,236,774 | B2 | 6/2007 | Lee |
| 7,340,390 | B2 | 3/2008 | Hurst et al. |
| 7,454,348 | B1 | 11/2008 | Kapilow et al. |
| 7,466,801 | B2 | 12/2008 | Miller et al. |
| 7,606,358 | B2 | 10/2009 | McGary et al. |
| 7,792,095 | B2 | 9/2010 | Srinivansan |
| 7,945,037 | B1 | 5/2011 | Hogg |
| 7,945,253 | B2 * | 5/2011 | Zellner ..................... 455/415 |
| 8,553,864 | B2 | 10/2013 | Chatterjee |
| 8,681,958 | B2 | 3/2014 | Chatterjee |
| 8,848,886 | B2 | 9/2014 | Toner et al. |
| 2003/0055667 | A1 | 3/2003 | Sgambaro et al. |
| 2004/0066920 | A1 | 4/2004 | Vandermeijden |
| 2004/0166832 | A1 | 8/2004 | Portman et al. |
| 2005/0100150 | A1 * | 5/2005 | Dhara et al. ............. 379/142.01 |
| 2005/0232247 | A1 | 10/2005 | Whitley et al. |
| 2006/0256780 | A1 | 11/2006 | Diroo et al. |
| 2007/0026852 | A1 | 2/2007 | Logan et al. |
| 2007/0101413 | A1 | 5/2007 | Vishik et al. |
| 2007/0116239 | A1 | 5/2007 | Jacobi et al. |
| 2007/0140176 | A1 * | 6/2007 | Bachenberg ....... G06Q 30/0226 370/335 |
| 2007/0143662 | A1 | 6/2007 | Carlson et al. |
| 2007/0280464 | A1 | 12/2007 | Hughes |
| 2008/0147404 | A1 | 6/2008 | Liu et al. |
| 2008/0152097 | A1 | 6/2008 | Kent |
| 2008/0235084 | A1 | 9/2008 | Quoc et al. |
| 2009/0028179 | A1 | 1/2009 | Albal |
| 2009/0043657 | A1 * | 2/2009 | Swift et al. ..................... 705/14 |
| 2009/0086939 | A1 | 4/2009 | Chatterjee |
| 2009/0110162 | A1 | 4/2009 | Chatterjee |
| 2009/0110179 | A1 | 4/2009 | Elsey et al. |
| 2009/0161845 | A1 | 6/2009 | Adams et al. |
| 2009/0181699 | A1 | 7/2009 | Tysowski |
| 2009/0203361 | A1 | 8/2009 | Huang et al. |
| 2009/0313097 | A1 * | 12/2009 | Chatterjee ............. G06Q 30/02 705/14.1 |
| 2009/0323912 | A1 | 12/2009 | Toner et al. |
| 2011/0039516 | A1 | 2/2011 | Fuller et al. |
| 2011/0077046 | A1 | 3/2011 | Durand et al. |
| 2013/0267195 | A1 | 10/2013 | Fuller et al. |
| 2014/0148139 | A1 | 5/2014 | Chatterjee |
| 2014/0369240 | A1 | 12/2014 | Toner et al. |

OTHER PUBLICATIONS

U.S. Appl. No. 11/904,871; Corrected Notice of Allowability dated Feb. 21, 2014; 5 pages.
U.S. Appl. No. 11/904,871; Issue Notification dated Mar. 5, 2014; 1 page.
U.S. Appl. No. 14/171,463; Non-Final Rejection dated Apr. 25, 2014; 24 pages.
U.S. Appl. No. 12/146,049; Notice of Allowance dated May 23, 2014; 13 pages.
U.S. Appl. No. 12/146,049; Notice of Panel Decision dated May 13, 2014; 2 pages.
U.S. Appl. No. 11/904,871; Final Rejection dated Aug. 27, 2012; 26 pages.
U.S. Appl. No. 11/904,871; Non-Final Rejection dated Apr. 30, 2012; 18 pages.
U.S. Appl. No. 11/904,871; Notice of Allowance dated Nov. 1, 2013; 25 pages.
U.S. Appl. No. 11/977,545; Final Rejection dated Jul. 17, 2012; 20 pages.
U.S. Appl. No. 11/977,545; Issue Notification dated Sep. 18, 2013; 1 page.
U.S. Appl. No. 11/977,545; Non Final Office Action dated Mar. 12, 2012; 12 pages.
U.S. Appl. No. 11/977,545; Non Final Rejection dated Dec. 21, 2012; 19 pages.
U.S. Appl. No. 11/977,545; Non-Final Rejection dated Sep. 29, 2011; 10 pages.
U.S. Appl. No. 11/977,545; Notice of Allowance dated Jun. 3, 2013; 17 pages.
U.S. Appl. No. 12/146,049; Final Rejection dated Dec. 31, 2012; 11 pages.
U.S. Appl. No. 12/146,049; Non-Final Rejection dated Jun. 22, 2012; 13 pages.
U.S. Appl. No. 12/146,049; Non-Final Rejection dated Oct. 6, 2011; 8 pages.
U.S. Appl. No. 12/146,049; Non-Final Rejection dated Jul. 19, 2013; 13 pages.
U.S. Appl. No. 12/146,049; Notice of Allowance dated Feb. 16, 2012; 5 pages.
U.S. Appl. No. 14/171,463; Final Rejection dated Aug. 15, 2014; 24 pages.
U.S. Appl. No. 12/146,049; Issue Notification dated Sep. 10, 2014; 1 page.
U.S. Appl. No. 14/470,757; Non-Final Rejection dated Jul. 7, 2015; 20 pages.
U.S. Appl. No. 14/171,463; Non-Final Rejection dated Aug. 5, 2015; 22 pages.
U.S. Appl. No. 14/470,757; Final Rejection dated Nov. 13, 2015; 15 pages.
U.S. Appl. No. 14/171,463; Final Rejection dated Dec. 15, 2015; 21 pages.

* cited by examiner

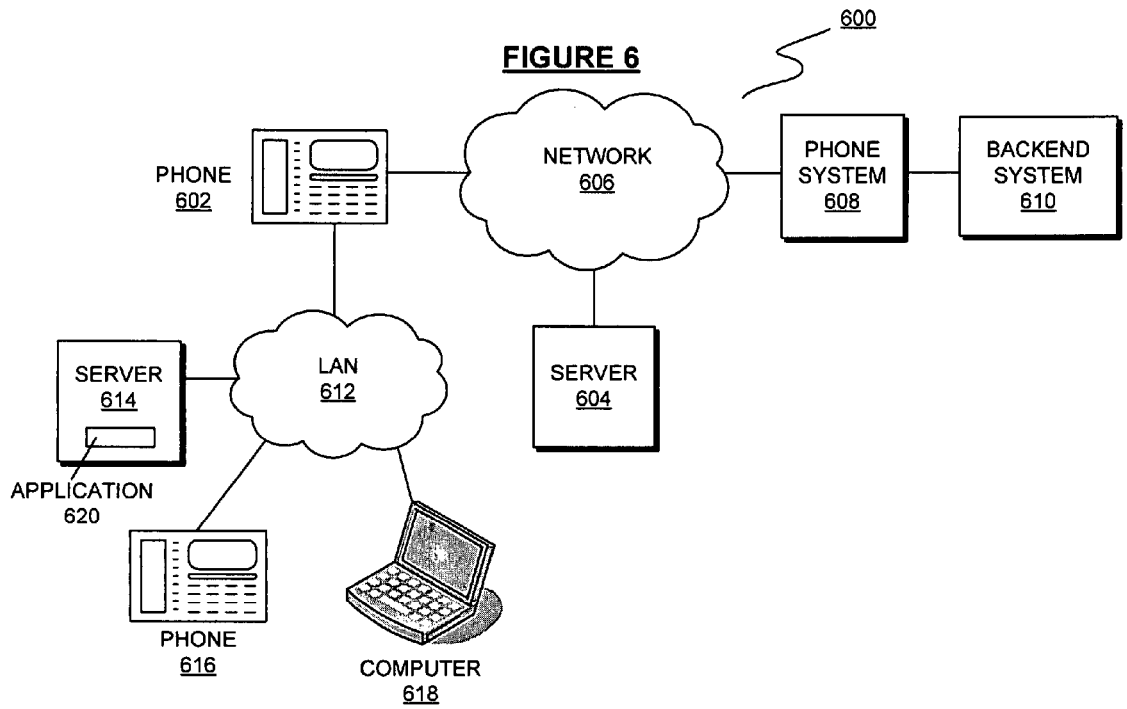
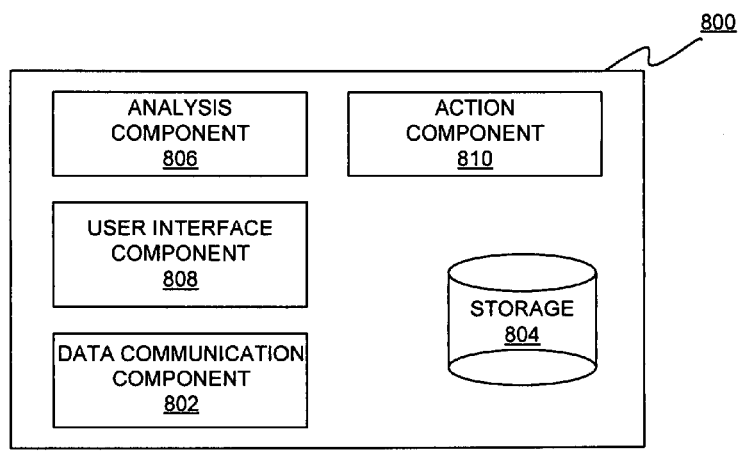

METHOD FOR PRESENTING INTERACTIVE INFORMATION ABOUT A TELECOMMUNICATION USER

CROSS REFERENCE TO RELATED APPLICATION

This application is a continuation of U.S. patent application Ser. No. 11/977,545, filed Oct. 25, 2007 by Koushik Chatterjee and entitled, "Method for Presenting Interactive Information About a Telecommunication User", which is hereby incorporated by reference in its entirety.

BACKGROUND

1. Field of the Invention

The principles of the present invention relate generally to an improved telecommunication system, and in particular, to an improved method of using a communication device. Still more particularly, the principles of the present invention relate to a method, apparatus, and computer usable program product for presenting interactive information about a telecommunication user on the communication device.

2. Description of the Related Art

Telecommunication involves two or more communication devices communicating with each other using a communication network. For example, two telephones may be able to communicate with each other using a telecommunication network called public switched telephone network (PSTN). PSTN is primarily a voice telecommunication network for enabling telephone-based telecommunications between two or more parties.

Data processing systems are often connected with other devices and data processing systems using a data network. The data network provides the networked data processing systems and devices with a communications medium over which data may be exchanged with each other.

Many types of wired and wireless networks are available for networking data processing systems, as well as communication devices. Wired networks utilize physical wires that can carry electrical data signals for connecting data processing systems and communication devices to communicate over the network. Wireless networks generally utilize radio waves for connecting the data processing systems and communication devices to the network in a wireless manner.

A communication device is a device from which a telecommunication call may be placed or received. The term "communication devices" refers to the collection of all devices used for telecommunication. For example, a communication device can be the familiar telephone, a computer with a telecommunication enabling software application (generally known as a softphone), a telephone-like device that works over data networks instead of a plain old telephone system (POTS) line, a wireless or cellular phone, or any other device used for telecommunication. A communication device is any one of these communication devices. Communication devices may also include devices and applications capable of communicating in other ways, for example, by text messaging, instant messaging including text, audio, video, images, and documents.

Various communication devices are capable of communicating with each other using a variety of networks. Some communication devices are able to communicate using analog signals over telecommunication networks, which are generally analog communication networks. Other communication devices, such as a voice over Internet Protocol (VOIP) enabled telephone, communicate over data networks. VOIP is a telecommunication method for transmitting voice communications over a data network, such as the Internet. Common VOIP implementations are in telephony where telephone conversations are partly or entirely carried over the Internet from a caller telephone to a called telephone. A VOIP call is a voice call connected using VOIP technology.

Certain presently available communication devices include telephony as well as data capabilities. These communication devices may conduct telephony using telecommunication network, data network, or both. For example, a phone may have access to only a telecommunication network on which the phone places and receives telecommunication calls. The phone, however, may also be able to make a data call by including a modem and using a dial-up service to connect to a data network, such as the Internet. As another example, a phone may have access to both telecommunication and data networks. The phone may use a telecommunication network for making a traditional analog call and the data network for making a VOIP call.

A calling party, calling user, or a caller, is a person or entity placing a telecommunication call. A called party, or a called user, is a person or entity receiving a telecommunication call. A calling communication device is a communication device used for placing a telecommunication call. A called communication device is a communication device used for receiving a telecommunication call. A calling phone number, or a caller phone number, is a number associated with the calling communication device. A called phone number is a number associated with a called communication device. A calling party name, or a caller name, is the name of the calling party. A called party name is the name of the called party.

Caller identification (Caller ID) is a feature commonly known to the telecommunication industry and to the users of telecommunication services. When a call is received on a communication device equipped with a display screen, such as on a modern day wireline or wireless phone, generally, a calling phone number with or without a name associated with the calling phone number is displayed on the communication device's display screen. Calling phone number with or without an associated name is called "caller ID."

Caller ID is also known as calling line identification (CLI) when provided via an ISDN connection to a private automatic branch exchange (PABX). In some countries, the terms caller display, call display, calling line identification presentation (CLIP), call capture, or just calling line identity (CLID) are also used to describe the caller ID feature.

Modifications to the caller ID include using an address in place of the name, such as for 911 purposes. However, caller ID is insufficient for information exchange, such as for messaging between users. Furthermore, a user cannot do much more with the caller ID information than receive the caller ID information as conventional caller ID is not of a nature that a user may interact with the displayed caller ID information.

SUMMARY

In order to provide interactive information including actions in addition to the caller ID information, the illustrative embodiments provide a method and system for presenting interactive information about a telecommunication user on a communication device. Providing interactive information on a communication device according to the illustrative embodiments may include identifying a party in a telecommunication call and receiving interactive information about the party. The received interactive information may be combined with user data to form combined interactive information. The combined interactive information may be displayed to a user. A user-action relating to the displayed combined interactive information may be received and an operation corresponding to the user-action may be performed.

Performing the operation may include composing a command based on the user-action and sending the command over a network for execution. Receiving the interactive information may be responsive to sending a request the interactive information, and the request may include an identity of the party as well as an identity of the user.

Providing interactive information on a communication device according to the illustrative embodiments may also include receiving the user data from one or more of a storage in the communication device and a data processing system accessible to the communication device. When the user data is received from a data processing system the additional information and the interactive information may be received from data processing systems that may be distinct from one another. Furthermore, providing interactive information may include determining if the user data is needed by analyzing the interactive information. The interactive information may include events, and the user data may include the user's schedule. The combining correlates the events with the schedule and creates a set of user-actions based on the correlation. Displaying the combined interactive information may include suggesting a set of user-actions to the user, and each user-action in the set of user-actions may correspond to at least one interactive action included in the combined interactive information.

BRIEF DESCRIPTION OF THE DRAWINGS

The novel features believed characteristic of the illustrative embodiments are set forth in the appended claims. The illustrative embodiments, however, as well as a preferred mode of use, will best be understood by reference to the following detailed description of an illustrative embodiment when read in conjunction with the accompanying drawings, wherein:

FIG. 6 depicts an alternative exemplary telecommunication environment in accordance with an illustrative embodiment;

FIG. 8 depicts a block diagram of an exemplary interactive information application in accordance with an illustrative embodiment.

DETAILED DESCRIPTION OF THE DRAWINGS

Figure 1:
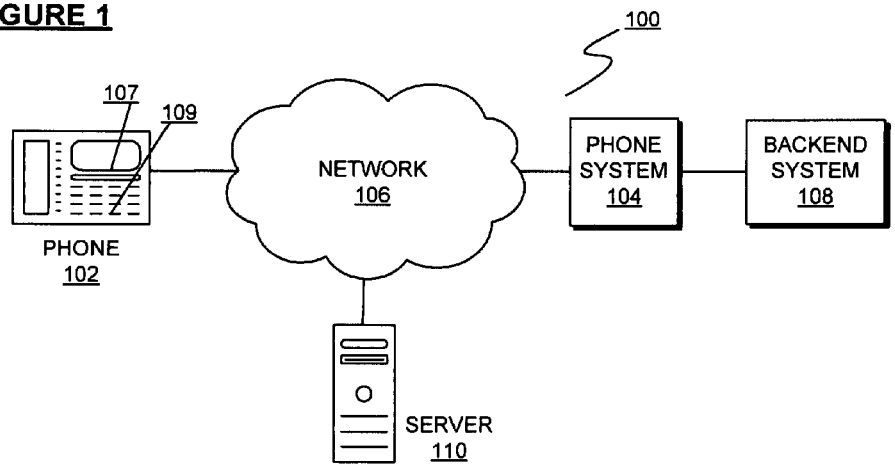
FIG. 1 depicts a block diagram of an exemplary telecommunication environment in which the illustrative embodiments may be implemented.

Users of telecommunication services find caller ID useful because of the information provided prior to accepting a call made to their communication devices. Caller ID identifies the calling user by providing a calling number and generally a name of a calling user to the called user.

Illustrative embodiments recognize that presently available caller ID information is limited in content and scope. For example, conventional caller ID is typically limited to informing a called user about the calling number and sometimes a name associated therewith. However, often, a called user may not be able to recognize the calling number or name and may be at a loss whether to accept the call. Furthermore, a user can employ presently available methods that hide the calling number, alter the calling number, hide the name, alter the name, or pretend to be a calling number and name different from the actual calling number and name. When a calling user employs such methods, the called user is at a further loss for information the user may need to decide whether or not to accept the call.

The illustrative embodiments provided herein also recognize that when caller ID is available, a called user may desire more information about the caller, caller's organization, subject of the anticipated conversation, and any other information that may be beneficial to the called user in making a decision whether to accept a call. Furthermore, the user may wish to take actions, such as select, drill down or up, receive more details, or transfer using certain parts of such additional information. Phone systems presently exist that include an interactive voice response (IVR) system for delivering audio menu and information to a user. A commonly used IVR system prompts a user to press certain keys on the user's telephone to make selections from the menu.

However, when a user interacts with an IVR system, the IVR system controls, sequences and times the user's actions. For example, a user generally has to wait until the voice announcement of all the menu options is complete before the user can make a selection. In such cases, the user does not have sufficient information or is not allowed to interact with the IVR system until the announcement is complete. A necessary drawback of a voice driven system, such as an IVR system, is that the information delivery is slow and sequential. As the number of options or the possible user actions grows, the longer the user has to wait to interact with the system.

Thus, a method, apparatus, and computer program product for visually presenting interactive information about a telecommunication user may be useful. Interactive information is information relating to one telecommunication user that another telecommunication user on a telecommunication call can receive, display, perform action using the display, manipulate, modify, and integrate with other information. Such a method, apparatus and computer program product are provided in the illustrative embodiments below, and may provide enhanced, additional, supplemental, or related information interactively about a caller identified by a caller ID, as well as about a called party.

With reference to FIG. 1, this figure depicts a block diagram of a telecommunication environment in which the illustrative embodiments may be implemented. Environment 100 includes phone 102 capable of telecommunicating with phone system 104 using network 106. A phone system is a communication device that is capable of delivering automated information before, during, or after a telecommunication call. For example, a PABX system is an example of a phone system and may be used as phone system 104. Phone 102 may be equipped with an electronic display 107, such as a liquid crystal display (LCD) screen, and to display information thereon. Display 107 of phone 102 may also be able to receive input from the user, such as via a touch screen if the electronic display 107 is a touch screen, via buttons located elsewhere on phone 102, or via a data processing system in communication with phone 102. In one embodiment, selection of keys on keypad 109 may cause interaction with the information on the electronic display 107.

Phone 102 and phone system 104 are examples of communication devices. Network 106 may include a data network, such as a local area network (LAN), a wide area network (WAN), for example, the Internet. Network 106 may also include a telecommunication network, such as PSTN.

Backend system 108 may be a data processing system that may interact with phone system 104. For example, backend system 108 may provide and revise IVR menus, and provide additional information, such as on-hold music for users connecting with phone system 104.

Server 110 may be a data processing system accessible via network 106. User of phone 102 may receive the interactive information about a user of phone system 104 from server 110. For example, phone 102 may receive a call, identify a caller with a caller ID, send a request for interactive information about the caller identified in the caller ID, receive the interactive information, and visually display the interactive information, such as on electronic display 107 of phone 102. Request for the interactive information may include an identity of the user of phone system 104, and may also include the identity of the user of phone 102.

User of phone system 104, such as a business establishment, may provide the interactive information stored on server 110. For example, backend system 108 may provide the interactive information to server 110. Persons and entities other than the user of phone system 102 may also author or edit the interactive information about the user of phone system 104 in server 110, such as by providing feedback about the business establishment using phone system 104.

Figure 2:
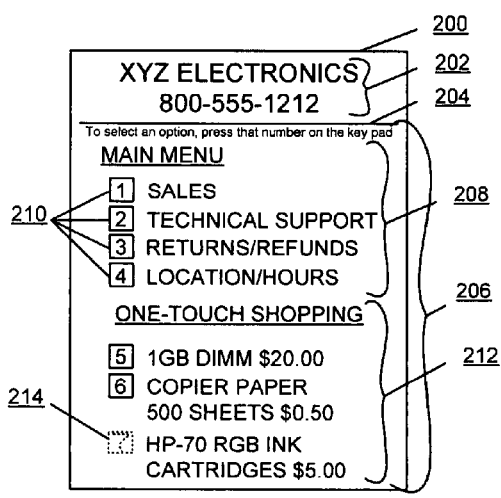
FIG. 2 depicts an exemplary display of interactive information in accordance with an illustrative embodiment.

With reference to FIG. 2, this figure depicts a display of interactive information in accordance with an illustrative embodiment. Display 200 may be a display screen on a communication device, such as electronic display 107 of phone 102 in FIG. 1. Once the communication device including display 200 receives interactive information, such as in the manner described with respect to phone 102 in FIG. 1, that information is displayed on display 200.

The interactive information may or may not be combined with the caller ID information for display on display 200. In one embodiment, caller ID information may be replaced by the interactive information received from the server. In another embodiment, the caller ID information may be modified and displayed in addition to the interactive information. In another embodiment, the caller ID information may be displayed as it was originally received, in conjunction with the interactive information.

In FIG. 2, display 200 is shown to include caller ID information 202, which includes a calling number and a name associated with that calling number. Display 200 may include some visual cues that the information being displayed has been grouped in some logical manner. For example, graphical dividers, dividing lines, blank space, color, type or size of fonts, and other similar techniques may be used for grouping information displayed on display 200. Dividing line 204 is an example of techniques that may be used for such grouping.

Interactive information 206 may include any number of actions a user may take with respect to the displayed interactive information. For example, interactive information 206 is shown to include main menu 208. Main menu 208 may be a visual representation of a menu delivered via IVR system, or any other information with which a user may interact. FIG. 2 depicts a visual version of a familiar IVR voice menu. The user viewing interactive information 206 may select an option from options 210 displayed in the interactive information. Selecting an option, such as pressing 1 on the phone keypad to connect to the sales department, is an action that the user is able to take using interactive information 206. Such an action is a user-action. Connecting to the sales department by receiving the data associated with pressing 1 on the phone keypad is an operation that is included in interactive information 206.

In some instances, an operation may trigger an interactive action. An interactive action is an action that the application displaying the interactive information may take with respect to a user-action. For example, upon a user-action of pressing the "1" key, may cause the application to construct a command for another data processing system to perform a task. The application referenced here is described in the description of FIG. 8 below.

Interactive information 206 may further include several sets of interactive information simultaneously. In contrast, present IVR systems are limited to delivering one set of voice based interactions at a time. A set of interactive information is one or more interactions grouped together in some rational way. For example, main menu 208 is a set of interactive information, which groups the call transfer options with which a user may interact in the example of FIG. 2. Shopping menu 212 is another set of interactive information that groups shopping options that a user can interact with in the same example. Main menu 208 and shopping menu 212 are displayed together in this exemplary display, enabling the user to control the sequence and timing of the user-action.

Figure 7:
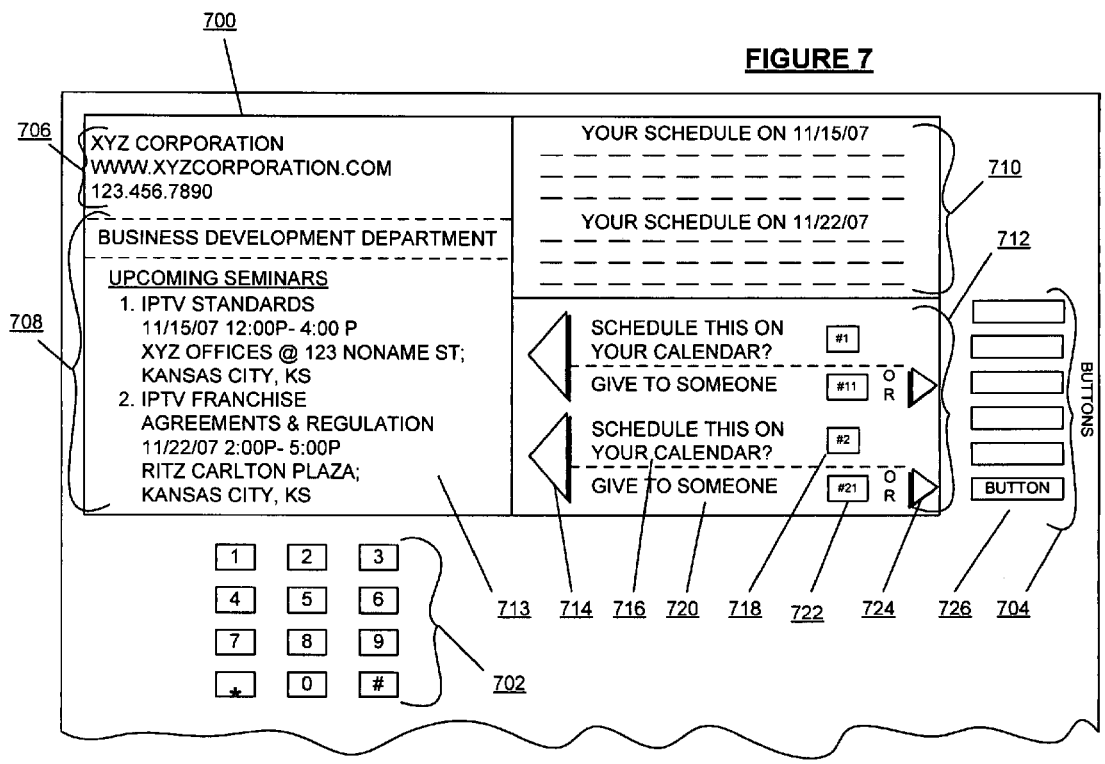
FIG. 7 depicts a display of exemplary interactive information in accordance with an illustrative embodiment.

Furthermore, interactive information 206 as received from a server, such as server 110 in FIG. 1, may not include specific keys to specific options. An application according to the illustrative embodiments that displays interactive information 206 on display 200 may compose the interactive information layout and assign keys or buttons to specific options present in interactive information 206. FIG. 7 and the description of FIG. 7 below describe the application.

Additionally, the interactive information as received from the server may include indicators with each piece of interactive information that indicates a status of that piece of interactive information. For example, shopping menu 212 includes option 214 that may pertain to interactive information for purchasing a specific item on sale. However, the interactive information about option 214 may include an indicator that the item is sold out. Option 214 may therefore appear as grayed out on display 200, and a user-action of pressing key 7 may not result in a sale of that item.

The sets of interactive information, their layout and key assignments, and the indicators associated with specific interactive information are only exemplarily used for the clarity of the description and are not limiting on the illustrative embodiments. Other sets of interactive information, their layouts and other indicators associated with specific interactive information are conceivable from this disclosure and within the scope of the illustrative embodiments. For example, scroll bars may be provided to enable a user to scroll up and down to view information that cannot completely fit on the electronic display.

Figure 2A:
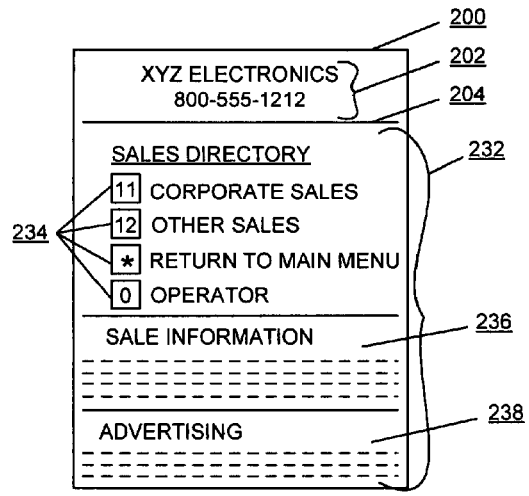
FIG. 2A depicts a second exemplary display of interactive information in accordance with an illustrative embodiment.

With reference to FIG. 2A, this figure depicts a second display of interactive information in accordance with an illustrative embodiment. Display 200, caller ID information 202, and dividing line 204 in this figure are the same as in FIG. 2.

Display 200 in FIG. 2A further includes interactive information 232, which results from a user-action of the user and interactive action executed in the interactive information 206 corresponding to the user-action in FIG. 2. Particularly, interactive information 232 may result from the user pressing the number 1 key on the phone that corresponds to option "Sales" in main menu 208 in FIG. 2. Interactive information 232 may include a second level menu, such as a directory of sales personnel at the organization identified in caller ID 202. Interactive information 232 may provide options 234 in a manner similar to options 210 in FIG. 2, and allow the user to take additional user-actions. In FIG. 2A, the second level menu is shown to include an option to return to the main menu, as well as other call forwarding options.

Interactive information 232 may or may not display additional sets of interactive information. For example, in display 200 in FIG. 2A, because the user has selected an option from main menu 208 in FIG. 2 instead of an option from shopping menu 212 in FIG. 2, interactive information 232 may not display a shopping menu again but may display information 236 pertaining to the sale. Information 236 may also be interactive. For example, the user may be able to click on information 236, such as by tapping on a touch screen, to cause shopping menu 212 in FIG. 2 to be displayed again.

Interactive information 232 may also include other information relating to previous user-actions, messages relating to the entity identified in the caller ID, or other information such as time, weather, or news headlines. In the exemplary display of FIG. 2A, interactive information 232 is shown to include advertisement 238, which, again, may or may not be interactive as described above.

Figure 2B:
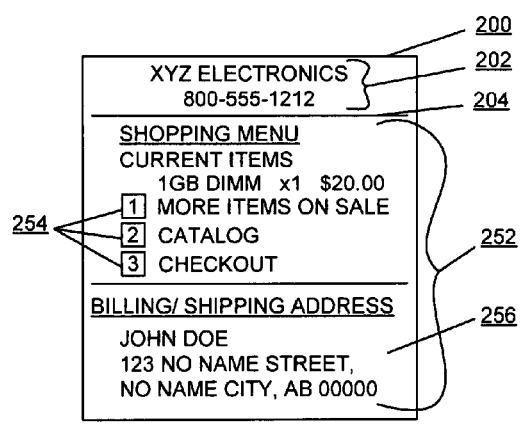
FIG. 2B depicts an alternative exemplary second display of interactive information in accordance with an illustrative embodiment.

With reference to FIG. 2B, this figure depicts an alternative second display of interactive information in accordance with an illustrative embodiment. Display 200, caller ID information 202, and dividing line 204 in this figure are the same as in FIGS. 2 and 2A.

Display 200 in FIG. 2B further includes interactive information 252, which results from a user-action of the user, and an interactive action executed in the interactive information 206 corresponding to the user-action, in FIG. 2. Particularly, interactive information 252 may result from the user pressing the number 5 key on the phone that corresponds to option "1 GB DIMM $20.00" in shopping menu 212 in FIG. 2.

Interactive information 252 may include a second level shopping options, such as a list of other items on sale, catalog of items, or back to previous menu, in options 254. Options 254 may also provide interactive information about other items related to the previous user-action, or may be fixed. When related to the previous user-action, options 254 may provide options that may be the logical next steps in a workflow, such as an option to checkout after a user-action of selecting an item. Interactive information 252 may provide options 254 in a manner similar to options 210 in FIG. 2, and may also allow the user to take additional user-actions.

Interactive information 252 may or may not display additional sets of interactive information. For example, in display 200 in FIG. 2B, because the user has selected an option from shopping menu 212 in FIG. 2 instead of an option from main menu 208 in FIG. 2, interactive information 252 may not display a main menu again, but may display information 256 pertaining to the sale. In FIG. 2B, information 256 displays the user's billing address that may be in a database of the seller of the item selected. Furthermore, information 256 may also be interactive. For example, the user may be able to click on information 256, the user's billing address, to cause a list of user's previously used addresses to be displayed so that the user may select a different address.

Shared housing, cohabitation, and group housing situations may find another application of the illustrative embodiments. For example, several individuals in a college dormitory room may share a common phone line. Consequently, the caller ID reflects either the name of one of those several individuals regardless of the person making/receiving the call, or no name at all but just the phone number. Using the illustrative embodiments, particularly the embodiment described in FIGS. 3 and 3A, a user may be able to receive interactive information pertaining to the intended individual in the group.

Figure 3A:
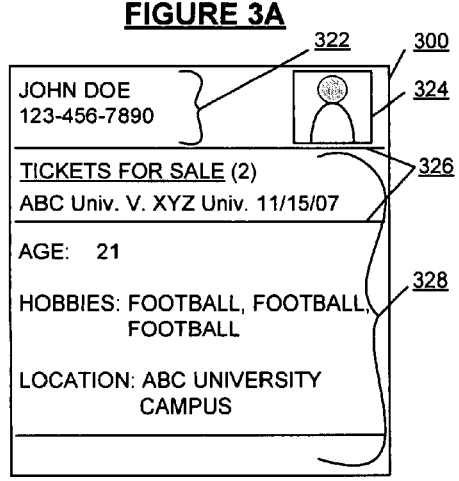
FIG. 3A depicts a second exemplary display of interactive information in accordance with an illustrative embodiment.
Figure 3:
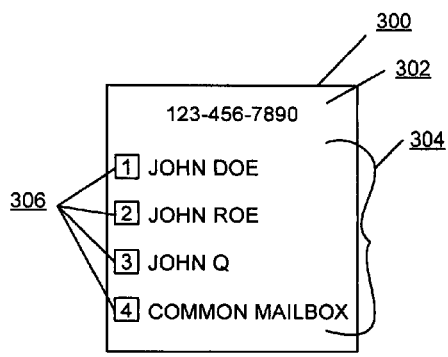
FIG. 3 depicts an exemplary display of interactive information in accordance with an illustrative embodiment.

With reference to FIG. 3, this figure depicts a display of interactive information in accordance with an illustrative embodiment. Display 300 is similar to display 200 in FIGS. 2, 2A, and 2B. Caller ID information 302 in FIG. 3 is exemplarily shown to include only the telephone number, as is the case with some caller IDs, but may also be similar to caller ID 202 in FIGS. 2, 2A, and 2B. Display 300 does not show any dividing line between groups of interactive information, but the interactive information layout uses spacing to separate the groups of interactive information. Display 300 further includes interactive information 304.

Interactive information 304 may present options 306, each option allowing the user a user-action to receive interactive information pertaining to the individual identified in that option. For example, the user may be able to press the number 1 key on the user's phone and receive information pertaining to "John Doe", press number 2 key and receive information pertaining to "John Roe", or press 4 for "general mailbox" and get general information, if any, related to the group as a whole.

With reference to FIG. 3A, this figure depicts a second display of interactive information in accordance with an illustrative embodiment. Display 300 is the same as display 300 in FIG. 3. The information displayed on display 300 results from a user-action with respect to interactive information 304 in FIG. 3. Particularly, the information depicted in FIG. 3A results from the user pressing the number 1 key on the user's keypad to select "John Doe" as the party about whom the user wishes to receive the interactive information.

Caller ID 322, is shown to now exemplarily include John Doe's name together with the number previously displayed as caller ID 302 in FIG. 3. A particular implementation may omit revising the caller ID in this manner. Picture 324 may also be optionally displayed. A particular implementation may substitute a graphic, icon, image, logo, or any other similarly displayable data for picture 324. Display 300 further includes dividing lines 326 as described with respect to FIG. 2.

Interactive information 328 may include detailed interactive information pertaining to the party selected in the user-action. For example, interactive information 328 may include messages from the party about items the party has for sale, organizations the party is affiliated with, personal description of the party, and the location of the party. Of course, any information provided by the party, third persons or entities, or both, may be similarly displayed in interactive information 328. Furthermore, some or all of this information may be interactive. For example, a user may be able to click on a name of an organization the party is affiliated with, such as the school the student attends, and receive more information about that organization.

Interactive information 328 may or may not display additional sets of interactive information. For example, interactive information 328 may also include the interactive information 304 in FIG. 3 as a second set of interactive information displayed simultaneously with interactive information 328 in display 300 in FIG. 3A. As another example, interactive information 328 may display a set of interactive information about the university the selected party attends, such as a football game schedule for the university's football team. Many other types of interactive information will be conceivable from this disclosure for displaying simultaneously with interactive information 328.

The sets of interactive information, their layout and key assignments, the indicators associated with specific interactive information, progression from one menu to another, user-actions, interactive actions, and other features of FIGS. 2, 2A, 2B, 3, and 3A are only exemplarily used for the clarity of the description and are not limiting on the illustrative embodiments. Other features displayable in the manner described above are conceivable from this disclosure and within the scope of the illustrative embodiments.

Figure 4:
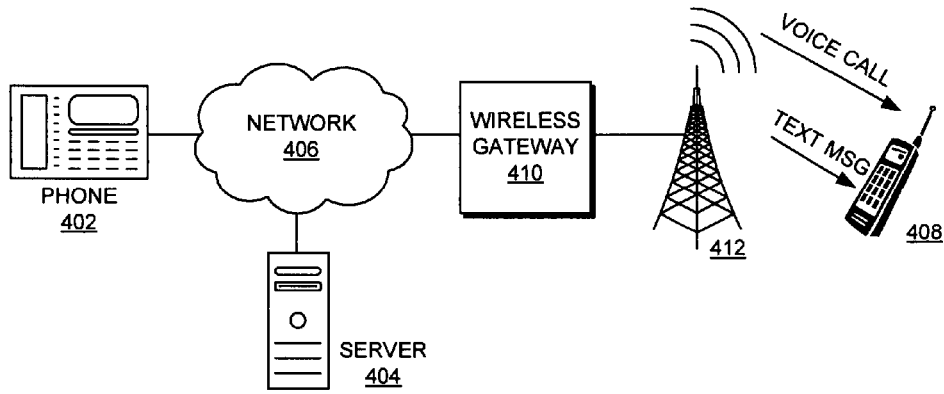
FIG. 4 depicts a second exemplary telecommunication environment in accordance with an illustrative embodiment.

With reference to FIG. 4, this figure depicts a second telecommunication environment in accordance with an illustrative embodiment. Phone 402 may be similar to phone 102 in FIG. 1. Server 404 may be similar to server 110 in FIG. 1. Network 406 may be similar to network 106 in FIG. 1.

Telecommunication environment 400 may be used when a user of phone 402 calls a user of device 408, which may be a wireless communication device, such as a mobile phone or a smart phone. The user of device 408 may wish to receive interactive information about the user of phone 402 before, simultaneously with, or upon receiving the call from the user of phone 402.

In operation, as the user of phone 402 places the call to device 408, phone 402 may send the called number information to server 404 over network 406. Server 404 may determine that device 408 is a wireless device, capable of receiving textual, graphical, or rich media information. Server 404 may compose the interactive information about the user of phone 402. Server 404 may communicate with wireless gateway 410 over network 406 and deliver the interactive information to wireless gateway 410 for delivery to device 408 in the form of text message, graphical interactive information, or rich media interactive information. Wireless gateway 410 may deliver the interactive information in any of these forms to device 408 using wireless communication infrastructure 412.

Wireless gateway 410 is shown only as exemplary. Any other service that is capable of delivering textual and/or graphical information to wireless communication devices may be used in place of wireless gateway 410. For example, server 404 may send an email containing the interactive information to an email address corresponding to device 408, instead of sending the interactive information to wireless gateway 410. Any method of delivery may be used for delivering the interactive information from the server to the wireless communication device without departing from the scope of the illustrative embodiments.

Thus, device 408 may receive a voice call from phone 402, and substantially simultaneously also receive interactive information about the user of phone 402 in text, graphical, or rich media form. The user of device 408 may then be able to interact with the interactive information, such as take a user-action, in the manner described above.

Figure 5:
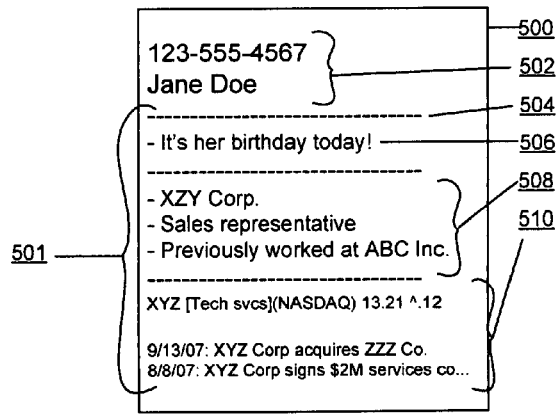
FIG. 5 depicts an exemplary display of interactive information on a wireless communication device in accordance with an illustrative embodiment.

With reference to FIG. 5, this figure depicts an exemplary display of interactive information on a wireless communication device in accordance with an illustrative embodiment. Display 500 may be a display screen on a wireless communication device, such as device 408 in FIG. 4. Once the wireless communication device including display 500 receives the interactive information that information may be displayed on display 500. The interactive information may or may not be combined with the caller ID that the wireless communication device may receive in conjunction with the voice call. In one embodiment, caller ID information may be replaced by the interactive information received from the server. In another embodiment, the caller ID information may be modified and displayed in addition to the interactive information. In another embodiment, the caller ID information may be displayed as it was originally received, in conjunction with the interactive information.

In FIG. 5, display 500 displays interactive information 501. Display 500 is further shown to include caller ID information 502, which includes a calling number and a name associated with that calling number. Display 500 may include some visual cues that the information being displayed has been grouped in some logical manner, as described with respect to FIGS. 2, 2A, 2B, 3, and 3A above. For example, graphical dividers, dividing lines, blank space, color, type or size of fonts, and other similar techniques may be used for grouping information displayed on display 500.

Messages relating to the caller may also be included in the interactive information. For example, message 506 informs the called party that the caller's birthday is today. Message 506 may alternatively inform the user that the caller's birthday just passed or is coming up. Contents of such messages, selection of such messages for display, and location on the display screen where such messages may be displayed may be configurable on the server as described with respect to server 110 in FIG. 1 above.

Assuming that the caller is calling the called party for a business matter, additional information, such as caller's business profile 508, may be included in interactive information 501 displayed on display 500. In the illustrated example, the caller's business profile 508 informs the called party that the caller works for XYZ Corporation as a sales representative, and previously worked for ABC Inc. Such information can be helpful to the called party in gaining some idea about the purpose of the call and preparing for the call.

Additional information such as business information 510 may also be helpful to the called party in learning what the call may concern. In the illustrated example, business information 510 informs the called party that the caller's company—XYZ Corp. is engaged in technology services business, trades on NASDAQ stock exchange, the present value and trend of the company's stock, and recent news items relating to the company or its business. In one embodiment, advertising or marketing information associated with the company may be presented in a similar manner.

The information depicted in FIG. 5 is only exemplary and not intended to be limiting on the illustrative embodiment. Other information may be added to or substituted for the exemplary information in FIG. 5. Furthermore, interactive information 501 displayed on display 500 may exceed the display space and the display may be scrolled to display all the interactive information available about the caller.

With reference to FIG. 6, this figure depicts an alternative telecommunication environment in accordance with an illustrative embodiment. Telecommunication environment 600 includes phone 602, which is a communication device with display capabilities, and may be similar to phone 102 in FIG. 1. Server 604 may be similar to server 110 in FIG. 1. Network 606 may be similar to network 106 in FIG. 1. Phone system 608 may be similar to phone system 104 in FIG. 1. Backend system 610 may be similar to backend system 108 in FIG. 1.

Phone 602 may be further in communication with local area network (LAN) 612. LAN 612 may facilitate data communication between two or more data processing systems, data enabled communication devices, and other data enabled devices. Server 614 may be a data processing system in communication with LAN 612. Server 614 may be a calendaring server, messaging server, or a server hosting any other application that exchanges data with other data processing systems and devices on LAN 612.

Phone 616 is an exemplary communication device also in communication with LAN 612. Computer 618 is another exemplary data processing system in communication with LAN 612. Any number of data processing systems and devices may communicate using LAN 612. Server 614 and any applications hosted therein may exchange data with phone 602, phone 616, and computer 618.

Application 620 may be hosted on server 614. For clarity of the description of the illustrative embodiments, application 620 is assumed to be a calendaring application that is hosted and running on server 614. Further, phone 602 is assumed to be a caller phone, and phone system 608 is assumed to be a called communication device.

In operation, a user of phone 602 may place a call to an entity corresponding to phone system 608. Upon placing the call, server 604, backend system 610, or both, may deliver interactive information to phone 602. Furthermore, server 614 may provide more information that may be combined with the interactive information so received, and the combined information may be displayed on phone 602. Information combined from various sources in this manner is called combined interactive information. Assume that the combined interactive information displayed on phone 602 includes interactive information about certain events that occur on certain dates and times. The user of phone 602 may be able to share such interactive information with other users on LAN 612, for example, the user of phone 616 or computer 618. The user of phone 602 may be able to upload such interactive information to a calendar on server 620 such that the event of the interactive information is placed on the user's schedule and the schedule of anyone else that the user designates.

Operating in this manner, using events and calendar as examples, the interactive information becomes sharable, modifiable, and capable of being manipulated across data networks. Furthermore, LAN 612 is only used as exemplary and the data network may be local area work, wide area network, virtual private network or any other type of data network. The calendaring application is chosen for the clarity of the description of telecommunication environment 600. Any other application that can benefit from, facilitate, or coordinate data exchange in a similar manner may be used without departing from the scope of the illustrative embodiments.

With reference to FIG. 7, this figure depicts a display of interactive information in accordance with an illustrative embodiment. Display 700 may be similar to display 500 in FIG. 5, display 300 in FIGS. 3 and 3A, or display 200 in FIGS. 2, 2A, and 2B. Display 700 may be of any size, orientation, or configuration, as may be displays 200, 300 and 500 referenced above. Display 700 may be a part of a communication device, such as phone 102 in FIG. 1 that includes keypad 702 and buttons 704 for performing other functions. Contents of display 700 are described as pertaining to a caller, to wit, display 700 displays caller's interactive information to a called party. Interactive information of a called party can be similarly displayed on display 700.

In FIG. 7, display 700 is shown to be of landscape format, capable of accommodating multiple columns of interactive information. Furthermore, interactive information displayed on display 700 may be combined interactive information, combining interactive information coming from several sources as described above with respect to FIG. 6. Display 700 displays caller ID information 706, which may be the unaltered caller ID as delivered by the telecommunication service provider, or modified based on interactive information related to the caller. Caller ID 706 is shown to include additional information, such as a link to the website of the caller's organization, in addition to the caller ID that may be delivered by a telecommunication service provider. Caller ID 706 is, therefore, also a piece of interactive information.

Display 700 further displays interactive information 708, interactive information 710, and interactive information 712. Interactive information 708 may include information about the caller or caller's organization. For example, interactive information 708 includes dividing lines for visual separation of displayed pieces of information. Interactive information 708 further includes identification of a particular department within the caller organization that is making the call. Interactive information 708 further includes information about scheduled events planned by that department.

Interactive information 710 may be interactive information pertaining to the called party, to whom display 700 is displaying the information. Interactive information 710 may come from an application server, such as server 614 in FIG. 6. For example, interactive information 710 is shown to include information about the called party's schedule on the days of the events planned by the calling department.

Interactive information 712 may include information about actions the user may take with respect to interactive information 708 and 710. Interactive information 712 may be generated by an application in accordance with an illustrative embodiment, that may be running on the communication device displaying the information. Such an application is described further with reference to FIG. 8 below.

In FIG. 7, interactive information 712 is shown to include visual commands, formed by the application in the communication device, and actionable by the user with respect to the interactive information displayed in interactive information 708 and interactive information 710. For example, interactive information 708 may include event 713 together with the date, time and place of the event, in an interactive form that is usable by the application in the communication device. The application in the communication device may generate interactive information 712 such that interactive information 712 includes visual reference 714 to event 713, together with user-action 716 that the user may perform with respect to event 713, and method 718 of performing user-action 716. In this example, interactive information 712 is shown to display a block arrow as visual reference 714, pointing to event 713, and suggesting "schedule this on your calendar" as user-action 716 that is possible with event 713. Interactive information 712 further the user informs that the user may press the "#" key on keypad 702, followed by the "2" key on keypad 702 to perform that user-action.

Interactive information 712 is further shown to include alternative user-action 720 that may be possible with event 713. Interactive information 712 also includes several alternative methods 722 and 724 of performing alternative user-action 720. In this example, interactive information 712 suggests "give to someone" as alternative user-action 720 with respect to event 713. This alternative user-action may result in placing the event on someone else's calendar across a data network. This exemplary alternative user-action may use an application running on a server, such as a calendaring application running as application 620 on server 614 across LAN 612 in FIG. 6.

Interactive information 712 exemplarily suggests two methods 722 and 724 for performing alternative user-action 720. Method 722 suggests pressing the "#" key, followed by the "2" key, and followed by the "1" key on keypad 702 to perform alternative user action 720. Method 724 suggests pressing button 726 for performing the same alternative user-action 720.

In this manner, display 700 may display combined interactive information, and facilitate user-actions that may interact with other applications on the communication device that includes display 700 or other devices and data processing systems accessible from that communication device. The specific visual references, key allocations and combination of interactive information in FIG. 7 are chosen only as exemplary in order to describe the illustrative embodiment. Many variations of these artifacts of display 700 will be apparent from this disclosure and are contemplated within the scope of the illustrative embodiment.

With reference to FIG. 8, this figure depicts a block diagram of an interactive information application in accordance with an illustrative embodiment. Application 800 may execute in a communication device, such as phone 102 in FIG. 1, having a display for interactive information, such as display 700 in FIG. 7. In one embodiment, application 800 may run on a data processing system separate from the communication device whose display is used for displaying the interactive information. In another embodiment, application 800 may have some components of application 800 executing on the communication device, and other components executing on another device or data processing system.

Application 800 may include data communication component 802, which may enable application 800 to communicate with other devices and data processing systems across local or wide area networks. Storage component 804 may store data that forms the interactive information as well as data that may be combined with the interactive information. The data stored in storage component 804 may also include data used in the execution of application 800, user data, or any other data that may be used for presenting interactive information on a display, such as caller ID 706 and interactive information 708-712 including graphical images on display 700 in FIG. 7.

Application 800 may further include analysis component 808 that analyzes the data and the interactive information that is to be presented on a display. For example, with reference to interactive information 712 in FIG. 7, analysis component 806 may identify the presence of scheduled events in interactive information 708 received from a server. Based on this identification, analysis component 806 may correlate the events to the user's schedule received from a calendaring application. Based on the comparison, analysis component 806 may determine that an event, such as event 713 in FIG. 7, is schedulable or not, and any user-actions in a set of user-actions that the user may be able to take with respect to the event. A set of user-actions is one or more user-actions.

User's schedule is an example of user data that may be combined with the interactive information. User data is data pertaining to the user to whom the interactive information is to be displayed. Other examples of user data include the user's email mailbox, task lists, contact lists, and word processing documents. Other examples of combining user data with interactive information may include inserting a caller's information in a contacts list, adding the link to the caller's company's website into the user's browser's bookmarks, and adding a scheduled event at a called party's organization to the user's to-do list.

User interface component 808 may configure the interactive information, combined interactive information, user data, and the results of the analysis from analysis component 806 in a form suitable for displaying on a given display. For example, user interface component 808 may reduce or enlarge a graphical icon used for visual reference 714 in FIG. 7 depending on the amount of information to be displayed. As another example, user interface component 808 may position that graphical icon so that the icon visually aligns with event 713 in FIG. 7. Other similar operations may be performed using user interface component 808 for managing the display of interactive information on the display.

Action component 810 may receive any user-actions executed by the user, such a pressing specific keys. Using the received user-actions, action component 810 may compose appropriate commands to performing the task indicated by the user action. For example, if the user presses the "#" key followed by the "2" key, action component 810 may compose a command for a calendaring application to place event 713 in FIG. 7 on the user's schedule. Data communication component 802 may then send that command to the calendaring application which may be application 620 executing on server 614 in FIG. 6.

The components of application 800 and the operations performed by those components are described above only as exemplary. The described components may be modified, merged or omitted, other components may be included, and other operations may be performed in application 800 without departing from the scope of the illustrative embodiments.

Figure 9:
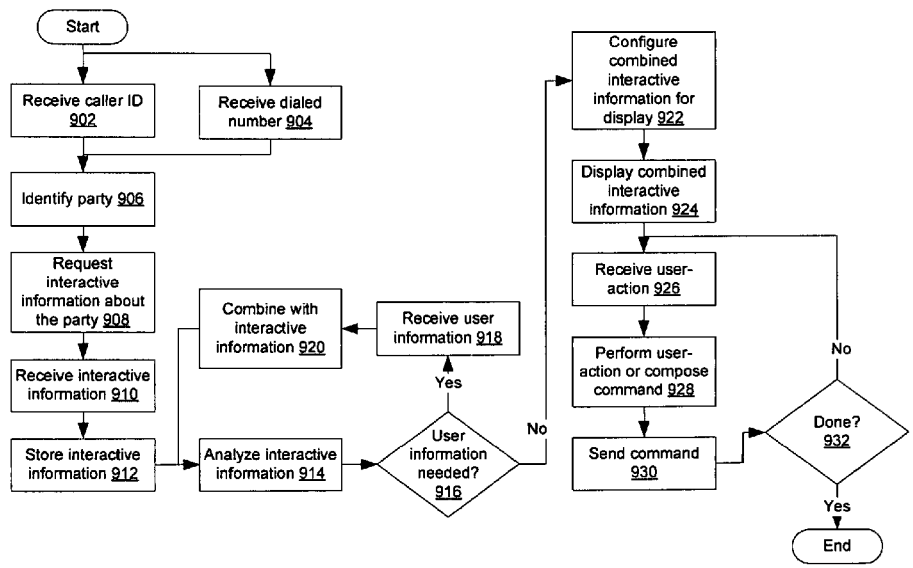
FIG. 9 depicts a flowchart of an exemplary process of presenting interactive information in accordance with an illustrative embodiment.

With reference to FIG. 9, this figure depicts a flowchart of a process of presenting interactive information in accordance with an illustrative embodiment. Process 900 may be implemented in application 800 in FIG. 8.

Process 900 can begin in one of at least two ways. The process may begin by receiving a caller ID when the display is on a called party's phone (step 902). The process may also begin by receiving the called number, if the display is on a calling party's phone (step 904). Either from the caller ID received in step 902, or the dialed number from step 904, the process identifies a party whose interactive information is desired (step 906).

The process creates a request for interactive information of that party (step 908). Responsive to the request, the process receives the interactive information (step 910). As an option, the process may store the received interactive information (step 912). The process analyzes the received interactive information (step 914). The process then determines if additional information, such as the user's schedule from the user's calendar, is needed (step 916). If additional information is needed, ("Yes" path of step 916), the process requests and receives that information from the appropriate source (step 918). The process may combine the additional information received in this manner with the previously received interactive information (step 920). The process may re-analyze the combined interactive information and re-execute steps 914 and 916 until further additional information is not needed.

If additional information is not needed, or sufficient additional information has been received ("No" path of step 916), the process configures the combined interactive information for display (step 922). The process the displays the combined interactive information (step 924).

The process may receive a user-action based on the interactive information that is displayed (step 926). The process may perform an action based on the user-action received in step 924, or create a command for another system to perform the action (step 926). If the process creates a command for another system, the process sends the command to the designated system (step 930). In one embodiment, if the process performs the action based on the user action in step 928, the process may omit step 930 as there may not be a command to send to another system.

The process then determines if more user-actions are expected (step 932). If more user actions are expected, the process returns to step 926 and performs steps 926-932 as described above. When the process does not expect any more user-actions ("No" path of step 932), the process ends. In one embodiment, the process may not expect any user-actions at all and end after displaying the combined interactive information in step 924.

The various steps of process 900 have been chosen and described only as exemplary and are not limiting on the illustrative embodiments. An implementation of the illustrative embodiments may alter, combine, delete or augment these steps without departing from the scope of the illustrative embodiments.

Although the principles of the present invention have been described using a caller ID communications protocol, alternative communications protocols may be utilized to provide interactive text ID services. For example, short messaging services or alternative text messaging services may be utilized.

Thus, the illustrative embodiments describe a method, apparatus and computer usable program product for presenting interactive information about a telecommunication user. Using the illustrative embodiments, a party receiving a call from a caller can get interactive information about the caller and be better prepared for the call as compared to when such interactive information is not available. Using the illustrative embodiments, a party placing a call to a called party can also get interactive information about the called party and reach the context of the call more expeditiously as compared to without such interactive information.

The illustrative embodiments can take the form of an entirely hardware embodiment, an entirely software embodiment or an embodiment containing both hardware and software elements. Furthermore, the illustrative embodiments can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communication link. This communication link may use a medium that is, for example without limitation, physical or wireless.

The above description has been presented for purposes of illustration and description, and is not intended to be exhaustive or limited to the illustrative embodiments in the form disclosed. Many modifications and variations will be apparent to those of ordinary skill in the art.

What is claimed is:

1. A method for providing interactive information on a communication device, the method comprising:
   receiving, with a communications network, an incoming telecommunications call directed to a called party;
   identifying a plurality of calling parties associated with the incoming telecommunication call;
   receiving interactive information about the calling parties;
   displaying, on a device controlled by the called party, the interactive information about the calling parties to the called party;
   substantially simultaneously to displaying the interactive information to the called party connecting the incoming telecommunications call to the device controlled by the called party;
   receiving a user-action from the called party, said user action comprising a request for additional interactive information about a selected calling party of the plurality of parties associated with the incoming telecommunication call; receiving and displaying to the called party additional interactive information about the selected calling party of the plurality of parties associated with the incoming telecommunication call.

2. The method of claim 1, wherein receiving the interactive information is responsive to sending a request the interactive information, and wherein the request includes an identity of at least one of the calling parties associated with the incoming telecommunication call.

3. The method of claim 2, wherein the request further includes an identity of the called party.

4. The method of claim 1, wherein displaying the interactive information includes suggesting a set of user-actions to the called party, and each user-action in the set of user-actions corresponds to at least one interactive action included in the interactive information.

5. A system for providing interactive information on a communication device, the system comprising:
   a communications network configured to receive an incoming telecommunications call directed to a called party;
   a data communication component configured to receive identifying information about a plurality of calling parties associated with the incoming telecommunication call and to receive interactive information about the calling parties;
   a device controlled by the called party having user interface component configured to display the interactive information to the called party, wherein the communications network substantially simultaneously displays the interactive information on the user interface and connects the incoming telecommunications call to the device controlled by the called party; and
   an action component configured to receive a user-action from the called party comprising a request for additional interactive information about a selected calling party of the plurality of parties associated with the incoming telecommunication call, wherein the data communication component and user interface receive and display to the called party additional interactive information pertaining to the selected calling party of the plurality of parties associated with the incoming telecommunication call.

6. The system of claim 5, wherein the action component is further configured to compose a command based on the user-action and the data communication component is further configured to send the command over a network for execution.

7. The system of claim 5, wherein the data communication component is further configured to send a request for the interactive information, including an identity of the called party in the request.

8. The system of claim 5, wherein the user interface component is further configured to display the interactive information, to suggest a set of user-actions to the called party, and to correspond each user-action in the set of user-actions to at least one interactive action included in the interactive information.

9. A computer usable program product in a non-transitory computer readable medium storing computer executable instructions for providing interactive information on a communication device that, when executed, cause a data processing system to:

receive, with a communications network, an incoming telecommunications call directed to a called party;

identify a plurality of calling parties associated with the incoming telecommunication call;

receive interactive information about the calling parties;

display the interactive information to the called party on a device controlled by the called party;

substantially simultaneously to displaying the interactive information to the called party connecting the incoming telecommunications call to the device controlled by the called party;

receive a user-action from the called party, said user action comprising a request for additional interactive information about a selected calling party of the plurality of parties associated with the incoming telecommunication call; and receive and displaying to the called party additional interactive information about the selected calling party of the plurality of parties associated with the incoming telecommunication call.

10. The computer usable program product of claim 9, wherein the instructions that cause the data processing system to perform the operation further cause the data processing system to:

compose a command based on the user-action; and send the command over a network for execution.

11. The computer usable program product of claim 9, further include instructions that cause the data processing system to:

send a request for the interactive information, wherein the instructions cause the data processing system to receive the interactive information responsive to sending the request, and wherein the request includes an identity of the calling party and an identity of the called party.

12. The computer usable program product of claim 9, wherein the instructions that cause the data processing system to display the interactive information further cause the data processing system to suggest a set of user-actions to the called party, wherein each user-action in the set of user-actions corresponds to at least one interactive action included in the interactive information.

\* \* \* \* \*